Sheet 1-2 Sheets.
A. Weber.
Bone Black Furnace.
No. 4,201 Reissued December, 13, 1870.
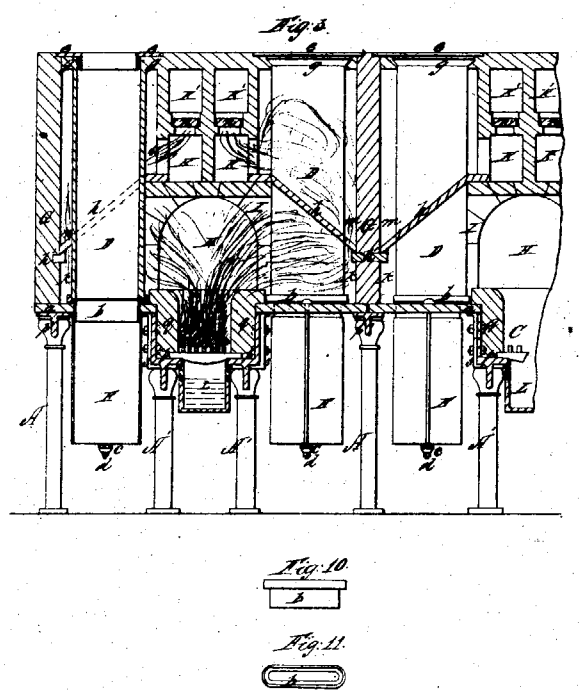
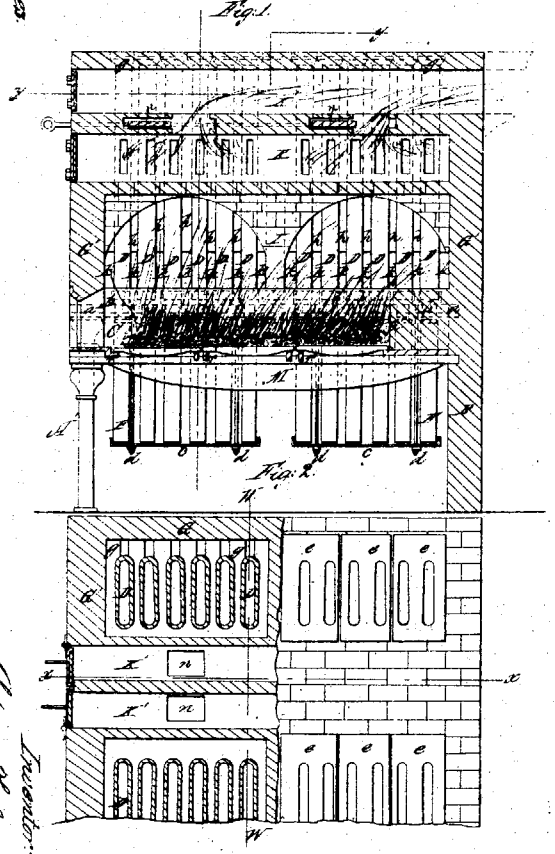
Witnesses.
Theo Fische
W. Spurni
Inventor:
Adam Weber
per Munn & Co
Attorneys Sheet 2-2 Sheets.
A. Weber.
Bone Black Furnace.
No. 4,201. Reissued December, 13. 1870.
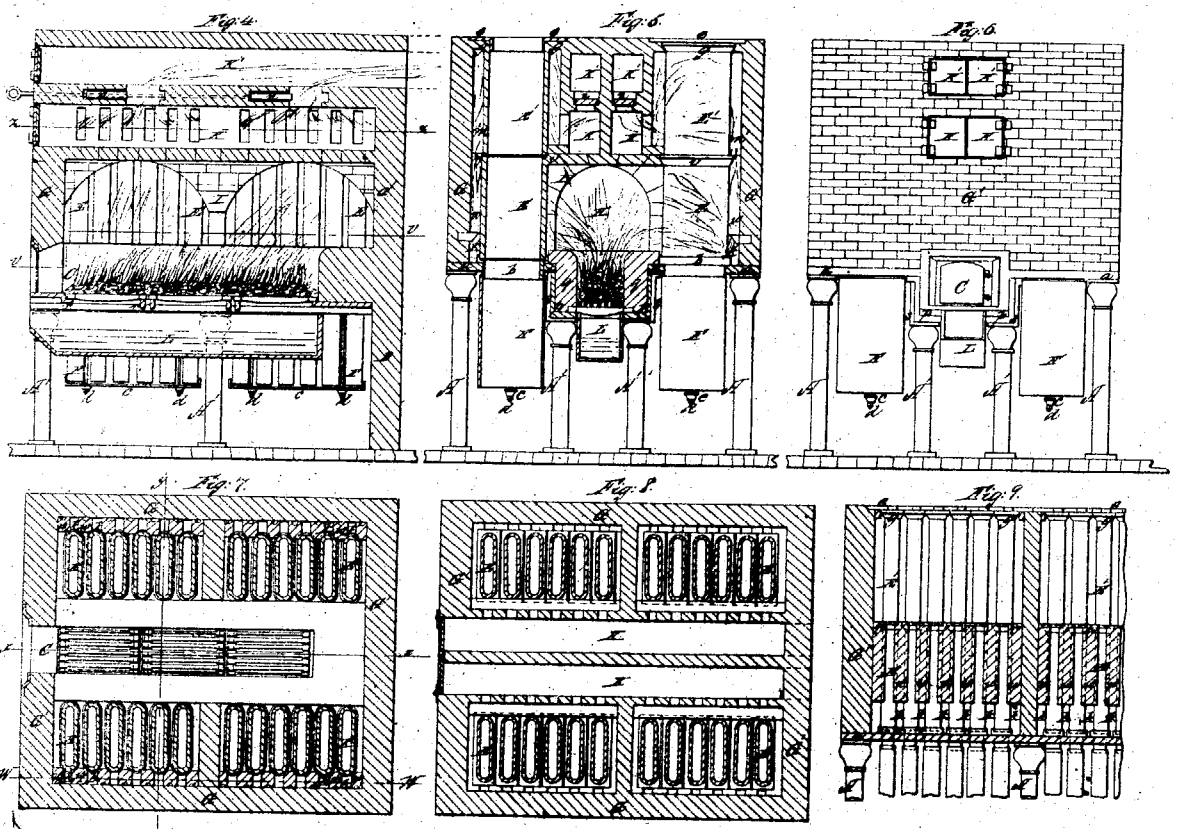
Witnesses:
Geo. Tuske
Wm. Friem
Inventor:
Adam Weber
Per Munn & Co Attys

United States Patent Office.

ADAM WEBER, OF NEW YORK, N. Y.

Letters Patent No. 65,457, dated June 4, 1867; reissue No. 4,201, dated December 13, 1870.

IMPROVEMENT IN FURNACES FOR BURNING BONE-BLACK AND OTHER SUBSTANCES.

The Schedule referred to in these Letters Patent and making part of the same.

*To all whom it may concern:*

Be it known that I, ADAM WEBER, of the city of New York, in the county and State of New York, have invented a new and useful Improvement in Kilns for Reburning and Purifying Bone-black, and for other purposes; and I do hereby declare that the following is a full, clear, and exact description thereof, which will enable others skilled in the art to make and use the same, reference being had to the accompanying drawing forming part of this specification, in which—

Figure 1 is a central longitudinal vertical section of my kiln of single retorts, taken in the line *x x*, fig. 2.

Figure 2, a partial horizontal section, taken in the line *y y*, fig. 1, and partial top view of same.

Figure 3, a transverse vertical section, taken in the line *w w*, fig. 2, showing two contiguous kilns.

Figure 4, a central longitudinal section of a kiln of double retorts, taken in the line *x x*, fig. 7.

Figure 5, a vertical transverse section, taken in the line *y y*, fig. 7.

Figure 6, a front view.

Figure 7, a horizontal section, taken in the line *w w*, fig. 4.

Figure 8, a horizontal section, taken in the line *z z*, fig. 4.

Figure 9, a partial section of a kiln, taken in the line *w w*, fig. 7.

Figures 10 and 11, details of the retort-socket.

Similar letters of reference indicate corresponding parts.

This invention relates to improvements in kilns or furnaces for reburning "bone-black," or bone-charcoal, which has been used in the refining of sugar, and become charged with vegetable matter, so as to destroy its filtering property; and It consists in building the said kilns or furnaces with single or double fire-clay retorts and fire-brick walls, floors, and covers, on iron columns, bed-plates, and girders, dispensing entirely with solid walls around the base, the said retorts being wholly inclosed by exterior walls in a fire-chamber, in which the heat surrounds them and acts upon their walls, and through said walls upon the contents of the retorts, which are open at the top for the reception of the bone-black, and the covering-wall of the fire-space is provided with openings coinciding with the openings of the retorts for feeding or supplying the substance from time to time to be acted on.

The said retorts are also open at the bottom, and the floor-wall of the fire-chamber is also provided with openings corresponding with them.

The arrangement is such that both the supply and discharge may be effected while the fire is kept constantly going, and without in any way interfering with it, the operation being thereby continuous and uninterrupted.

When the furnace is employed for purifying bone-black, coolers are attached to the bottom of the retorts for the reception of the bone-black as it settles down through the retorts to hold it for cooling previous to being removed, and to facilitate the removal.

The retorts are so arranged in relation to each other, and the fire-flues between them and around them, that the heat from the furnace is diffused equally over their entire surfaces, and retained wholly in contact with the retorts until it escapes through outlets into chambers under a drying-floor, or directly into the chimney.

By my improved mode of construction, the lower ends of the retorts are set in cast-iron sockets, which project through the bed-plate of the kiln for attaching thereto the sheet-iron coolers, and the upper ends of the retorts are so formed as to dispense with the iron separating-bars in ordinary use; and the iron coolers are suspended by means of hanging rods instead of being supported upon flange-irons in the walls of kilns, as commonly constructed.

The advantages of my improved construction of bone-black kilns are cheapness in building and durability in use, while they are more effective in operation, by the equalization of the heat around the retorts, in such manner that the charcoal is more thoroughly penetrated with the heat and purified, and by the free circulation of fresh air under the kiln and around the iron coolers, in such manner that the heated charcoal is more speedily cooled and discharged, thus burning and passing the bone-charcoal through the kiln after the vegetable matter has been entirely expelled.

The plan is also convenient for the workmen, who can pass between the iron columns that support the furnace to get at and discharge the coolers, or remove the plugs and discharge ore, which cannot be done with kilns built on the old plan, with supporting-walls instead of columns.

A A′ are cast-iron columns, upon the caps of which rest iron bed-plates, *a a*, for the support of the kiln, which columns are placed under the front and under the middle of the bed-plates *a a*; or when girders are used, as hereinafter described, the middle columns may be dispensed with.

The foundation of the kiln in the rear may be either columns or a wall, B, as shown in the drawing, figs. 1 and 4.

C is a furnace in the center of the kiln, running from front to rear, and a series of retorts is placed on each side of the furnace.

The retorts are made of fire-clay in an elongated or flat oval shape sectionally, and are either single or double.

For small kilns single retorts are used, and for large kilns double retorts. Both kinds are shown in the drawing, and the especial adaptations of each kind, hereinafter described.

D D, fig. 3, represent the single, and

E E′, figs. 5 and 9, the double retorts.

The lower ends of the retorts are each set in a cast-iron collar-seat, or hollow socket, *b*, seen in detail, figs. 10 and 11, which socket shoulders upon and passes through the bed-plate *a*, and projects below far enough to form a neck, on which the upper end of a sheet-iron cooler, F, is slipped over in the manner of stove-pipe joints.

The series of sheet-iron coolers F, thus attached to the sockets *b b* under the series of retorts on one side of a kiln, is supported by hanging rods *c c*, which run from front to rear in sections under the coolers, and are suspended by hangers *d d*, which are fastened above to the bed-plate *q*, as shown in figs. 1 and 4.

The upper ends of the retorts are covered with iron cap-plates, *e*, on the top of the kiln, in the usual way; but the iron rods in common use to separate the upper ends of the retorts are dispensed with by forming collars or flanges *g g*, figs. 3, 5, and 9, around the mouth of the retort under the cap-plates *e*, which touch at the edges of the adjoining retorts and are sealed with fire-clay cement.

Fire-brick walls G G are built upon the bed-plates *a, a* on the outside of the series of retorts, as also walls G′ G′ on the front and rear ends of the kiln, and the outside walls G of a kiln form party walls when two or more kilns are built side by side, with the bed-plates *a a* of the two kilns resting jointly on one column, as shown in fig. 3.

The fire-chamber H is made of fire-brick blocks, laid up in shapes to form groined arches I I, which spring from the ends and middle of the bed-plates *a a*, on both sides of the furnace, as shown in longitudinal section of the fire-chamber in figs. 1 and 4, and transversal section, figs. 3 and 5.

This arrangement of groined arches to form the fire-chamber allows the flames and products of combustion to pass directly from the body of the pipe-chamber or body of the furnace against and between the sides of the lower parts of the retorts. as shown clearly in the drawing.

The spaces between the single retorts D D are closed by narrow fire-clay partitions *h h* formed upon the adjacent retorts, which are joined to the upper corner of the arches on each side of the furnace, and slope downward diagonally to the opposite or outer sides of the retorts nearly to the bottom thereof, leaving only spaces *k k* for the passage of the products of combustion, which, after rising between the retorts to the partitions *h h*, are directed downward by them, and thus directed behind the retorts, as shown in fig. 3.

The partitions *h h*, at their lower ends, extend across a flue-space, *m*, on the back side of the retorts to the side wall G, joining and resting upon blocks or bricks *h′ h′* projecting from the wall. Thus the passage of the flame is cut off and directed upward against the narrow sides of the retort throughout the fire-space *m*, between them and the wall G, and thence between the retorts, against their flat sides, back to the opposite or inner side of the retorts, where it enters the lower tier of horizontal flues K K over the fire-chamber H, and through them to and through the upper tier of flues K′ K′, and thence directly to the smoke-stack, as shown in figs. 1, 2, 3, 4, and 5, or to the floors of drying-rooms, as indicated, fig. 1.

The chambers K′ K′ over the fire-chamber are provided with dampers, *n n*, at oppposite ends, to regulate the draught and heat applied to the retorts.

The double retorts E E′ are constructed and arranged differently from the single retorts, for diffusing the heat equally over their surfaces.

The upper ends of the lower sections E of the double retorts are made with flange-rims *v v*, that form sockets for receiving the lower ends of the upper sections E′ in the same manner as drain-pipes are connected.

These rims or heads *v v* unite and fill the spaces between the retorts, as shown in fig. 9, and thus form partitions, which cut off the spaces between the upper from those of the lower sections of the double retorts.

Now, the flame and products of combustion pass directly between the lower sections of the double retorts E in the same manner as between the lower portions of the single retorts below the partitions *h h*, and are diffused over their surfaces equally before they can escape at the back side through fire-spaces *k k*, at the bottom, under fire-brick blocks *w w*, which project from the side walls and fill up the spaces in the back part of the retorts above the fire-spaces *k k*, up to the heads *v v* of the retorts, as shown in figs. 7 and 9.

These blocks *w* also serve to brace the retorts at the edges against the outward pressure of the contents of the retorts, which is very great when the ore is being reduced.

The ribs *h* also serve the same purpose for the sides of the single retorts, and more may be employed, if necessary.

The products of combustion pass from the fire-spaces *k k* up on the back sides of the retorts to the spaces *m′*, between the double retorts and the side walls G, and circulate equally between the upper sections of the retorts. They then enter and pass through the horizontal flues K K′, either direct to the chimney or to the drying-floors, as hereinbefore described.

An iron ash-pan, L, is suspended under the furnace, and kept supplied with water, to catch the ashes and prevent dust, and also to increase combustion by the steam arising therefrom.

The caps of the central iron column A′, figs. 3 and 5, are shorter than the outside column A, and support angle-iron girders *p p*, which support the fire-brick sides *q q* of the furnace and the bearers *r r* of the grate-bar.

These girders, *p p*, are bolted in front to flat side-plates *s s*, cast on the heads of the columns, which extend up and set under the inner sides of the bed-plates *a a* for their support.

The girders *p p* extend from the front to the rear of the kiln, where their ends rest in the rear foundation wall B.

Girders *p′* are also placed on the outer sides of the kiln, resting in front on the columns A, and in the rear in the wall B.

By the use of these girders the middle columns under the kiln may be dispensed with, and they may be strengthened with ribs M below, as shown in fig. 1.

Having thus described my invention,

I claim as new and desire to secure by Letters Patent—

1. The columns A′, having cast upon their upper ends the plates *s s*, in combination with the angle-plates *p p*, supporting the fire-bricks *q q*, the bed-plates *a a*, and ash-pan L, substantially as described, for the purpose specified.

2. The arrangement of the inclined partitions *h h* between the single retorts D D, and cast upon them, and between the fire-spaces *k k* and *m m* in the rear of said retorts, substantially as described, for the purpose specified.

3. The horizontal fire-flues K K′ and dampers *n n*, in combination with the retorts, substantially as described, for the purposes specified.

4. The hanging rods *c*, extending in sections from front to rear under the coolers, and suspended from the plate *a* by means of the hanger *d*, arranged to support a series of retorts, as herein set forth, for the purpose specified.

5. The suspended iron ash-pan L, in combination with the furnace C, substantially as described, for the purpose specified.

6. The flanges *v*, cast upon the upper ends of the lower sections of the retorts E, arranged in such a manner as to form partitions between the upper retorts and lower retorts E and E′, substantially as described, for the purpose specified.

7. The combination, with the walls G and the retorts, of the projections *w*, substantially as specified.

8. The retorts, made either in one or more parts, inclosed at the sides, tops, and bottoms, in a furnace having the openings at the top and bottom for the supply and discharge of the substance subjected to the action of the heat therein, and arranged on posts or other supports, affording access to the discharge-openings beneath, all substantially in the manner described.

ADAM WEBER.

Witnesses:
GEO. W. MABEE,
L. S. MABEE.